(12) United States Patent
Libicki (10) Patent No.: US 6,237,098 B1
(45) Date of Patent: May 22, 2001

(54) SYSTEM FOR PROTECTING WEIGHT VERIFICATION DEVICE PRIVATE KEY

(75) Inventor: Charles M. Libicki, Bexley, OH (US)

(73) Assignee: Interface Logic Systems, Inc., Columbus, OH (US)

( * ) Notice: Subject to any disclaimer, the term of this patent is extended or adjusted under 35 U.S.C. 154(b) by 0 days.

(21) Appl. No.: 09/256,918

(22) Filed: Feb. 24, 1999

Related U.S. Application Data (63) Continuation-in-part of application No. 09/064,362, filed on Apr. 22, 1998.

(51) Int. Cl.[7] .................................................. H04L 9/00
(52) U.S. Cl. ........................................... 713/185; 380/277
(58) Field of Search ..................................... 713/170, 171, 713/172, 176, 178; 705/60

(56) References Cited

U.S. PATENT DOCUMENTS

| | | | |
|---|---|---|---|
| 5,136,646 | 8/1992 | Haber et al. ............................ | 380/49 |
| 5,136,647 | 8/1992 | Haber et al. ............................ | 380/49 |
| 5,373,561 | 12/1994 | Haber et al. ............................ | 380/49 |
| 5,583,765 | 12/1996 | Kleehammer .................... | 364/423.98 |
| 5,640,002 * | 6/1997 | Ruppert et al. ...................... | 235/472 |
| 5,655,023 | 8/1997 | Cordery et al. ...................... | 380/51 |
| 5,655,024 | 8/1997 | Bell et al. ............................. | 380/51 |
| 5,805,711 * | 9/1998 | Windel et al. ......................... | 380/55 |
| 5,884,238 * | 3/1999 | Noll et al. ............................ | 702/150 |
| 5,905,232 * | 5/1999 | Schwartz et al. ...................... | 177/25 |
| 5,910,989 * | 6/1999 | Naccache .............................. | 380/25 |
| 6,064,994 * | 5/2000 | Kubatzki et al. .................... | 705/410 |

\* cited by examiner

*Primary Examiner*—Gail Hayes
*Assistant Examiner*—Jeffrey Scott Leaning
(74) *Attorney, Agent, or Firm*—Standley & Gilcrest LLP (57) ABSTRACT

The present invention is a Weight Verification Device (WVD) that stamps a weight transaction record with a digital signature so that transaction data may be verified at a later time. The WVD is an Application Specific Integrated Circuit (ASIC) device that is installed in a sealed digital weight indicator. When a vehicle is weighed using this digital weight indicator, a weight transaction record is stamped with a digital signature and stored in a computer. The WVD may be used to confirm that the inbound and outbound weights and the date and time are accurate, that the transaction data have not been tampered with, and that the transaction as a whole has not been modified in any way since the time the transaction record was created. The digital signature stored with the transaction data is based on a secure hash of the transaction data and a "private" key belonging to an inspector from the Weights and Measures Department or a designated representative. The private key is entered into the WVD as an encrypted message that the WVD decrypts before using it to sign transactions. The private key is erased automatically whenever the digital weight indicator's seal is breached.

15 Claims, 5 Drawing Sheets

SYSTEM FOR PROTECTING WEIGHT VERIFICATION DEVICE PRIVATE KEY

This application is a continuation-in-part of U.S. patent application Ser. No. 09/064,362 filed Apr. 22, 1998.

BACKGROUND OF THE INVENTION

1. Field of the Invention

The present invention relates generally to digital weight indicators and more particularly, to digital weight indicators having weight verification devices that operate in accordance with secure digital signature technology measures to verify weight transaction data.

2. Description of Related Art

The duty of the State Departments of Weights and Measures is to ensure that weight data employed in commercial transactions are fair and accurate. And yet, as computer technology assumes a greater role in the capture, processing, and transmission of weight data, the traditional methods of assuring fair weights and measures are increasingly inadequate to the task.

At the present time, when a weight inspector calibrates and seals a digital weight indicator, he or she verifies that the weighing system is capturing a fair and accurate weight, and that it adheres to accepted weighing procedures. Once the weight data leave the indicator, however, to be processed by attached computer equipment, no such verification is possible. An inspector may witness a transaction and see that it was performed properly, but there is no guarantee that the software will continue to perform in a fair and accurate way under actual conditions of use. There is no guarantee that the software that was inspected is even the same software that will be used in daily operations. Participants in a transaction may be given scale tickets or other paperwork to verify the weighing transaction, but since any paper output is itself the product of the attached computer equipment, they are just as easily forged. The situation is, of course, worse for those participants in a weighing transaction who are not present at the weighment, who only receive electronic confirmation, and yet charge or pay based on numbers received electronically. The possibilities for fraud are obvious.

The costs of combating fraud can be substantial, including mailing of signed scale tickets back and forth, or even duplication of the weighing process on both the vendor's and customer's scales. In many cases, it is not possible to recover the original weight. For example, if a vehicle is involved in an accident, the original (easily forged) scale ticket or bill of lading may be required as evidence of whether the vehicle was overloaded. Additionally, the reliance on paper tickets can be an impediment to the further development of electronic commerce.

SUMMARY OF THE INVENTION

The present invention is a Weight Verification Device (WVD) that uses digital signature technology to verify weight transaction data. The WVD is an Application Specific Integrated Circuit (ASIC) device that is installed in a sealed digital weight indicator (or scale). Alternatively, the features and functionality of the WVD could be integrated with the design and manufacture of the digital weight indicator itself. When a vehicle is weighed on the digital weight indicator, a record of the transaction is created and stored on a computer. The WVD stamps each weight transaction record with a digital signature so that the transaction data may later be verified. Additional precautions are taken to further protect the private key transmitted to the WVD and used to digitally sign the weight transaction data.

The WVD confirms that the inbound and outbound weights and the date and time and the weighing equipment identifier are accurate, that the transaction data have not been tampered with, and that the transaction as a whole has not been modified in any way since the time the transaction record was created. The digital signature stored with the transaction data is based on a secure hash of the transaction data and a "private" key belonging to an inspector from the Weights and Measures Department or a designated representative. The private key is entered into the WVD in a secure manner and is erased automatically whenever the digital weight indicator's seal is breached or whenever a metrologically significant change is made that would normally require resealing. Digital signature technology public key cryptography is further used to protect the private key during transfer of the private key to the WVD.

The WVD is an ASIC that operates in conjunction with software residing in a scale operator's computer. The software adheres to a specific protocol. The WVD is interposed on a serial line between the computer and the digital weight indicator (or indicators, one per indicator). The WVD comprises a processor, memory, two serial ports, and circuitry to detect breaching of the seal, or other metrologically significant configuration changes. Alternatively, the components and functionality of the WVD may be integrated in the design and manufacture of the indicator itself. Optionally, the connection between the digital weight indicator and the load cell (from which the vehicle weight is determined) may be secured. Software to verify the authenticity and accuracy of the transaction data may be installed and run from any computer that processes or relays the transaction data.

Once installed within a digital weight indicator, the WVD is sealed in such a way that breaking the seal (for instance, as is done for weight calibration) or any change in the configuration that would normally require resealing also erases the inspector's private key. The operation of the digital weight indicator is not affected, but any subsequent transactions are not stamped with the digital signature. The software then leaves the digital signature field of the transaction record blank so it is clear to any user of the transaction data that the security of the WVD has been breached and the transaction data may have been modified.

The proposed Weight Verification Device makes a weight inspector's seal relevant in the world of computer transactions and electronic data interchange. The device is targeted to the weighing of commercial truck traffic, but the same device may be exploited for any other commercial weighment where the economic value of an individual weighment warrants the expense of verification. The goal of the Weight Verification Device is to provide a transaction in electronic form, that anyone can verify, even if that person has no access to the original weighing equipment, that the transaction contains fair and accurate gross, tare and net weights, that the weighments were performed at the times stated, using the identified equipment, and that no information on the transaction has been altered since the moment the final weight was captured. The authority that verifies the integrity of the transaction is neither the buyer nor the seller, nor the owner of the weighing equipment, but the state inspector.

The use of digital signature technology in a digital weight transaction record is unique to the present invention and results in several benefits. The use of digital signature technology public key cryptography to further protect the private key used to digitally sign the weight transaction data is also unique to the present invention. Other types of encryption/decryption or encoding/decoding technology may be used to achieve the benefits of the present invention. The WVD produces an electronic or digital weighing transaction record such that, without accessing the weighing equipment, the holder of the transaction data can verify that the transaction record contains accurate weights and times and that the information in the transaction record has not been altered since a final net weight was obtained. The weight transaction data may be verified by software that complies with the public protocol of the applicable digital signature standard. Additional security measures further prevent the likelihood of an impostor obtaining an inspector's private key and fraudulently signing transactions. Consequently, fraud in weighing transactions is reduced and businesses that receive shipments of material by weight may rely on the transaction data record and devote fewer resources to verifying the actual weight of incoming shipments.

DETAILED DESCRIPTION OF THE PREFERRED EMBODIMENT(S)

Figure 1:
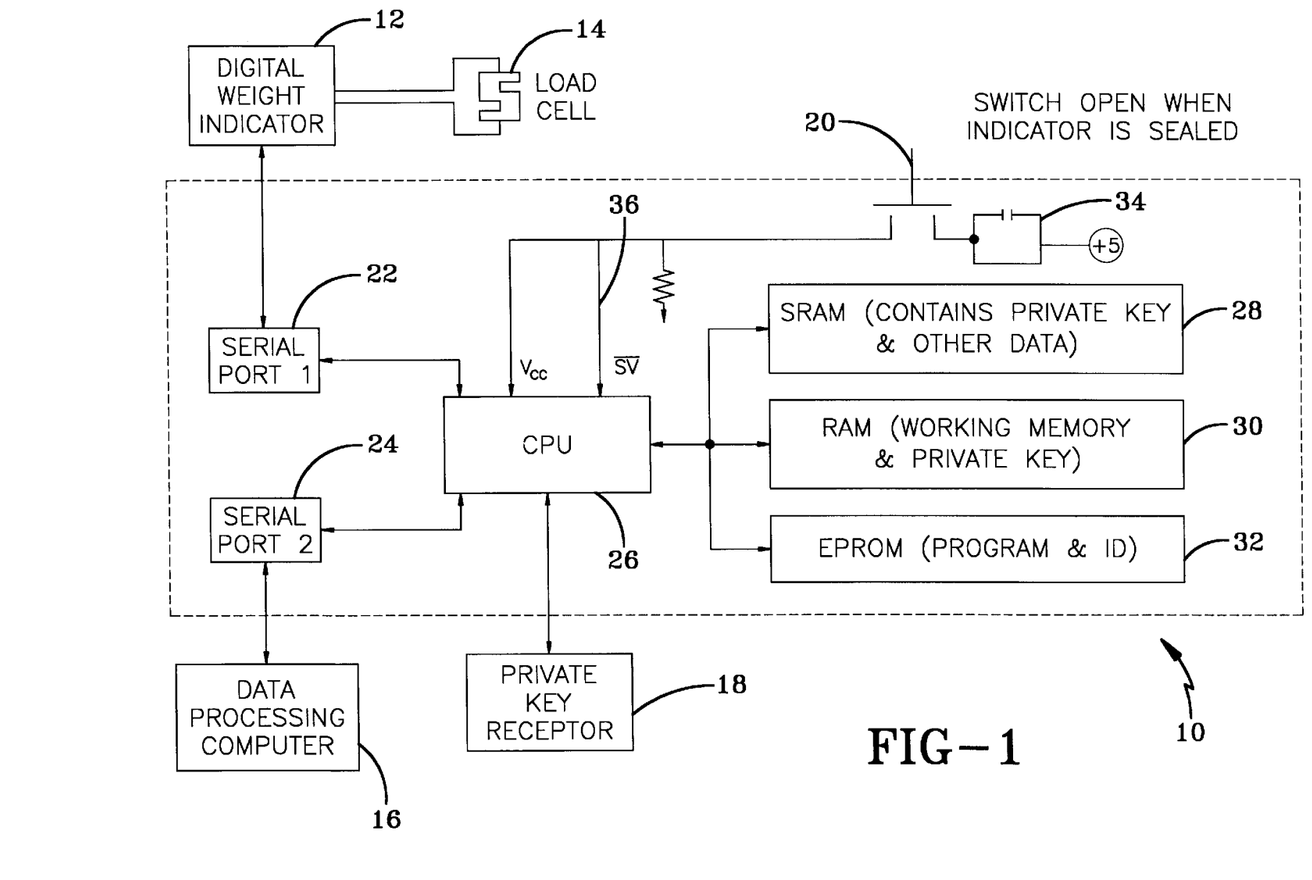
FIG. 1 is a schematic diagram of a preferred embodiment of the present invention.

The present invention—the Weight Verification Device (WVD)—is an Application Specific Integrated Circuit (ASIC) device installed in a sealed digital weight indicator that operates in conjunction with a scale. Alternatively, the components and functionality described herein may be incorporated into the design and manufacture of the weight indicator itself. Referring to FIG. 1, a schematic diagram of a preferred embodiment of the present invention is shown. The WVD 10 is interposed between a digital weight indicator 12 and a data processing computer 16 with which a scale operator interacts. The data processing computer 16 may alternatively be referred to as a scale operator's computer. The WVD, preferably, is installed in a tamper-proof fashion in the digital weight indicator 12 at the time of manufacture or as an add-on. The WVD is then sealed by an inspector from the Weights and Measures Department or a designated representative. At the time of sealing the WVD, the inspector's private key is transmitted to the WVD so weight transaction data may be signed using the inspector's private key in conjunction with digital signature technology. The digital weight indicator 12 obtains the weight of a vehicle or other object from a load cell or loads cells 14 on which the vehicle or object is placed for weighing. The weight obtained by the digital weight indicator 12 from the load cell(s) 14 is then transmitted to the WVD 10 and thence to the data processing computer 16 (or scale operator's computer) for subsequent processing.

The WVD 10 may be equipped with a central processing unit (CPU) 26, memory units 28, 30, 32, and two serial ports 22, 24 through which connections to the digital weight indicator 12 and data processing computer 16 are established. Transaction data may then be transmitted between the digital weight indicator 12 and data processing computer 16 through the WVD 10 via the serial ports 22, 24. As the WVD 10 interposes itself on the serial line, it is usable with any digital weight indicator that has continuous RS-232 output. A digital weight indicator with a clock output may add to the security of the system. Different digital weight indicator protocols may be accommodated by downloading a list of parameters particular to that digital weight indicator at installation or manufacture time. In a preferred embodiment, the WVD 10 is a small device, capable of being easily inserted and sealed within a typical digital weight indicator 12 case. Preferably, the WVD 10 is equipped with circuitry 20 to detect breaching of the seal or other metrologically significant changes.

Each time a vehicle is weighed on the digital weight indicator 12, a record for the weight transaction is created by software, preferably, at the data processing computer 16 (or scale operator's computer). Each weight transaction record may be comprised of a number of fields—including a digital signature field—in which data or information about the weight transaction is stored. Within the WVD 10, the application software for processing of weight transaction data is stored in an EPROM 32. The EPROM 32 also contains a unique identifier for the WVD 10 and associated digital weight indicator 12 (scale identifier) as well as for the inspector who installed the WVD 10 in the digital weight indicator (inspector identifier). The scale identifier indicates the source of the weight transaction data so anyone reviewing the transaction data may determine where the transaction data originated (i.e., where the vehicle was weighed). The inspector identifier indicates who sealed the WVD in the digital weight indicator. Finally, the inspector's private key data used to generate a digital signature for the weight transaction may be stored in an SRAM 28 in the WVD 10.

At the time of installation, or at any time the indicator is adjusted or calibrated, the inspector seals the digital weight indicator 12 and programs into the WVD 10 his personal, inspector identifier (e.g., a two-character state code followed by a sequence number), and his private key. Preferably, the programming is completed through a direct contact interface 18 to minimize opportunities for eavesdropping. The private key itself may be sent in an encrypted message so that even if a message with the private key is intercepted by an eavesdropper, the eavesdropper will be unable to decrypt the message and learn the inspector's private key. The WVD 10 may be programmed to decrypt the message containing the private key and then load the private key in the SRAM 28 in the WVD 10. The indicator identifier and model, preferably, is pre-programmed into the WVD EPROM 32 at the time of installation. Preferably, programming is completed on a sealed digital weight indicator 12 and in a secure manner.

The WVD 10 may be installed within a digital weight indicator 12 and then sealed in such a way that breaking the seal (for instance, as is done for weight calibration equipment) or making any change in the configurations that would normally require resealing erases the inspector's private key. In a preferred embodiment of the present invention, a micro-switch 20 on the WVD 10 remains open as long as the digital weight indicator is sealed. Security is enforced in the following manner: the micro-switch 20 is positioned such that when the digital weight indicator 12 (or the door to access the calibration equipment) is opened, the switch 20 is released. Releasing the switch 20 brings a small battery 34 on-line to power the WVD 10 if it was not already powered. It also raises the voltage on the "signature valid" (SV) pin 36 on the WVD 10. When the WVD 10 sees that the SV pin 36 is high, it deletes the private key. The WVD 10 is not physically damaged when the indicator is opened.

The private key may be reinstated simply by closing the door and reloading it in the same way as was done at initialization. Preferably, attempting to remove the WVD 10 from the digital weight indicator 12 destroys it. The WVD is destroyed once it is removed so that it may not be connected to an unauthorized digital weight indicator.

Preferably, upon breaking of the seal or any other metrologically significant event, the operation of the digital weight indicator is not affected, but the WVD does not stamp the weight transaction record with a digital signature. The absence of a value in the digital signature field indicates the integrity of the digital weight indicator has been compromised and that the transaction data may have been modified. Once the indicator is resealed, the private key may be re-installed by the inspector. Preferably, the private key is transmitted to the WVD in an encrypted message through the private key receptor (i.e., direct connect interface) 18.

As indicated in FIG. 1, in a preferred embodiment of the present invention the WVD 10 is interposed on a serial line 22, 24 so that all transaction data or messages transmitted between the data processing computer 16 and the digital weight indicator 12 pass through the WVD 10. Normally, all transaction data pass through the WVD transparently. However, in a preferred embodiment, when the WVD 10 receives a special "arming" character from the data processing computer 16, weight reporting from the digital weight indicator 12 is suspended and the data processing computer 16 communicates only with the WVD 10. If, for some reason, it is necessary to send this same arming character to the digital weight indicator 12, two arming characters rather than one may be sent to the WVD 10. The WVD 10 may then pass the second arming character to the digital weight indicator 12 and resume transparent operation. The WVD 10 may also resume transparent operation once its conversation with the data processing computer 16 is complete or after a "time-out" period has passed. In an alternative embodiment of the present invention, the components, features, and functionality of the present invention may be integrated into the digital weight indicator. The protocol for transferring and protecting information exchanged between the various components of the present invention is the same for either embodiment.

Figure 2:
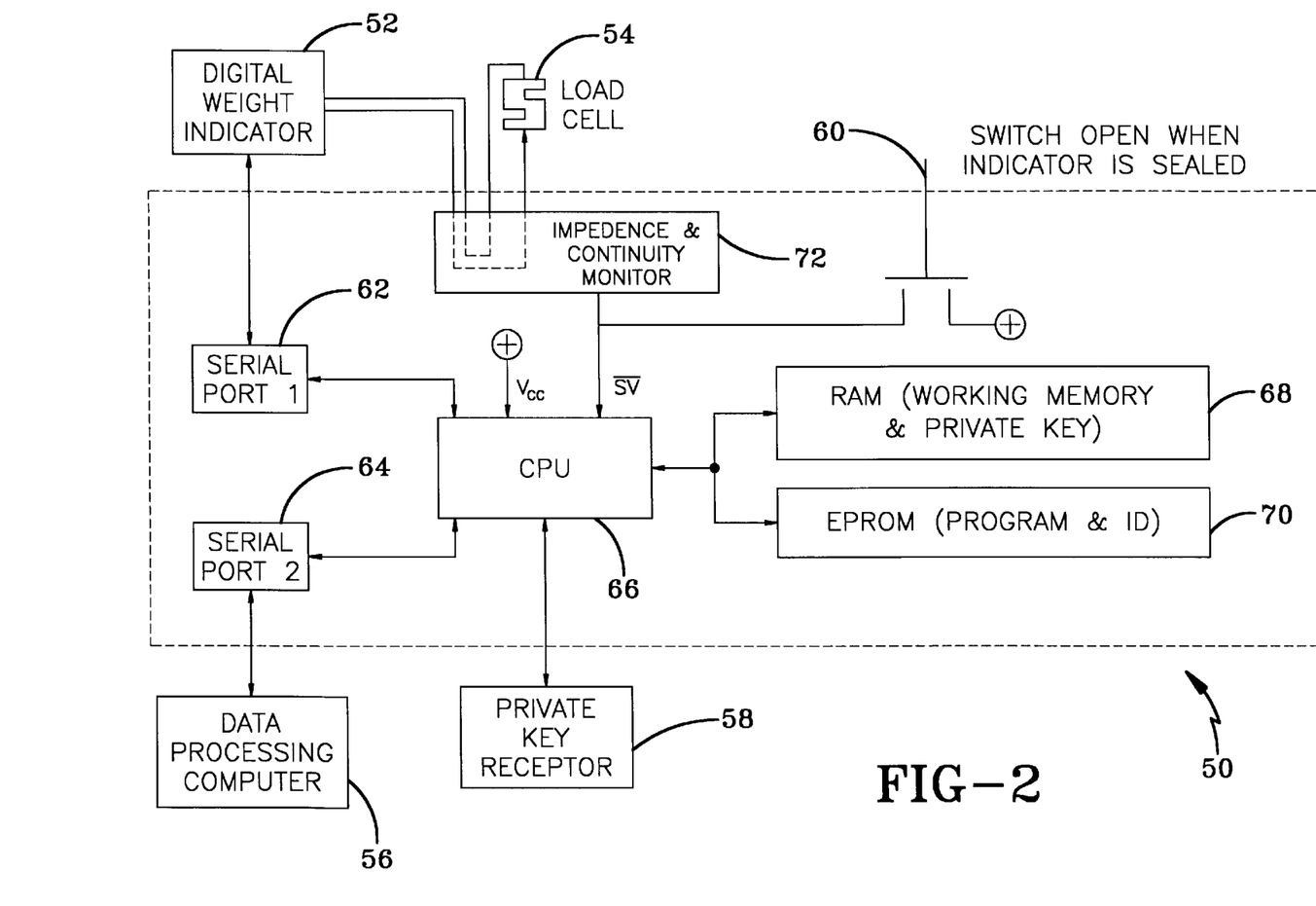
FIG. 2 is a schematic diagram of a second embodiment of the present invention.

Referring to FIG. 2, a schematic diagram of a second embodiment of the present invention is shown. In this embodiment, the components are arranged in a manner similar to the preferred embodiment as shown in FIG. 1 except the connection between the digital weight indicator 52 and the load cell or load cells 54 is secured. In this "Secured Load Cell" configuration, communications between the digital weight indicator 52 and load cell 54 pass through an impedance and continuity monitor 72 that is part of the WVD 10. In the Secured Load Cell configuration, the WVD 50 monitors the impedance and continuity 72 of the load cell 54 lines. This monitoring prevents substitution of a simulator or other load cells for the set against which the digital weight indicator was calibrated. With this option, however, the WVD may require a continuous source of power.

Figure 3A:
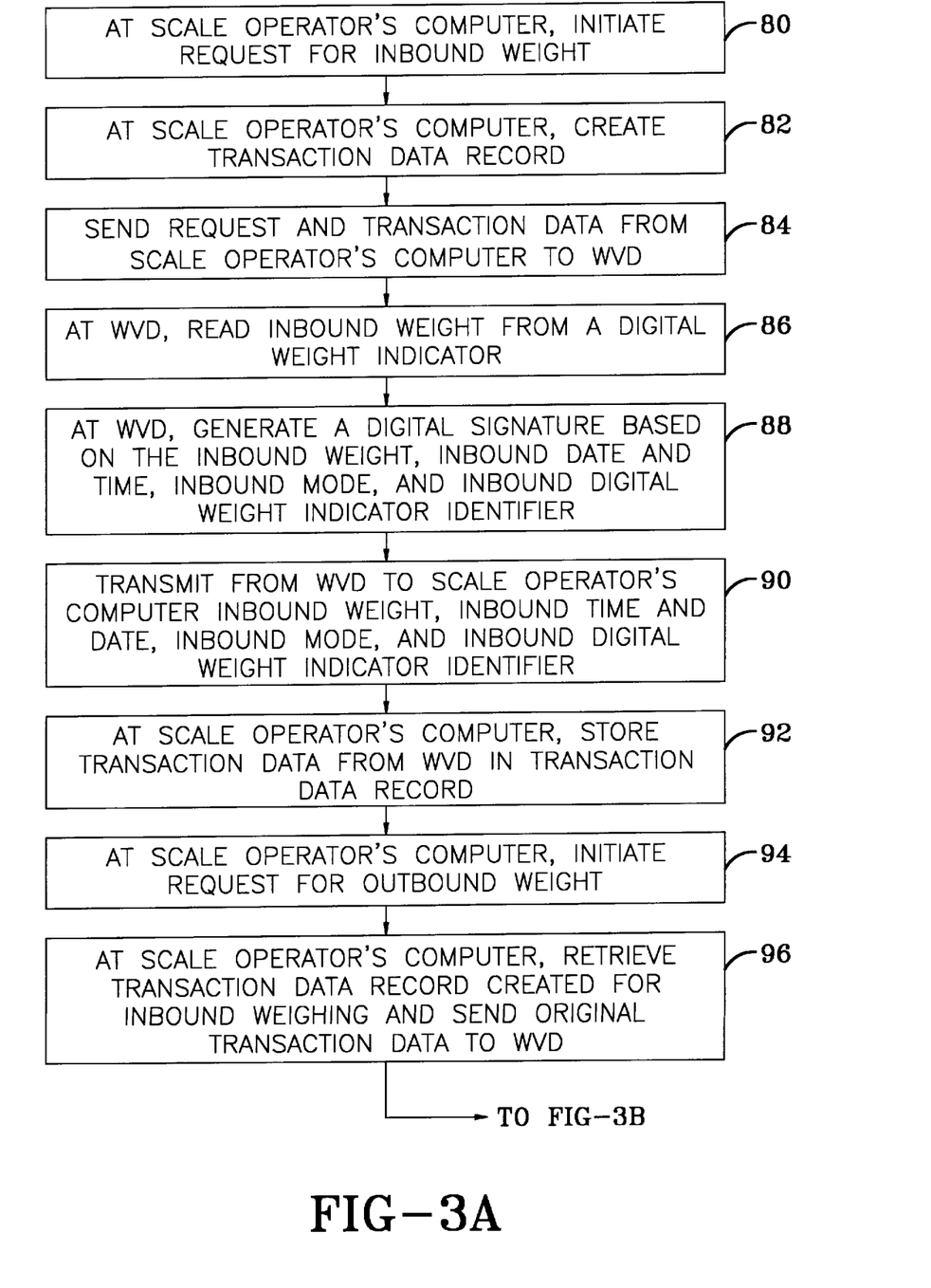
FIG. 3 is a flowchart of the operation of a preferred embodiment of the present invention.
Figure 3B:
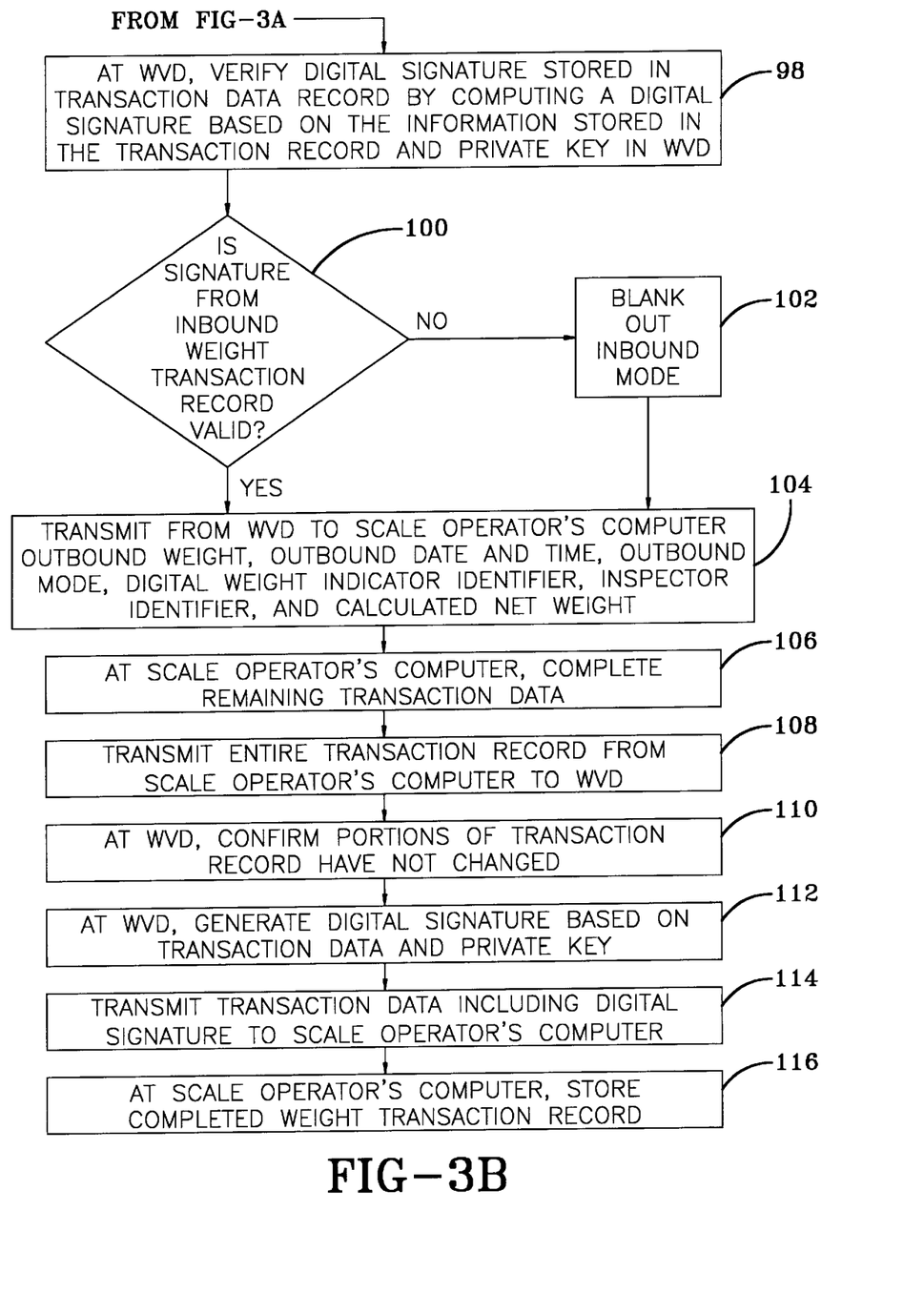

Referring to FIG. 3, a flowchart of the primary steps for operation of the present invention is shown. After the weight verification device has been installed such that it is in communication with a digital weight indicator and a scale operator's computer, the inspector enters his personal identifier and private key via the private key receptor (or direct contact interface). Preferably, the private key is transmitted in an encrypted message that the weight verification device alone can decrypt. The encryption and decryption techniques are based, preferably, on digital signature technology public key cryptography. The weight verification device is then ready for use. A typical weighing cycle consists of an initial weighing (or inbound weighing) and a final weighing (or outbound weighing). The positive difference between the initial weight (inbound weight) and the final weight (outbound) is the net weight. To begin a weighing cycle, a request for an inbound or initial weight is initiated at a scale operator's computer 80. The request may include a vehicle identifier and other information that may be stored in a weight transaction record.

When the request for the inbound weight reading is initiated, a transaction data record or packet comprising a number of data or information fields is created, preferably, at the scale operator's computer 82. Preferably, a weight transaction record consists of a fixed portion and a free portion. The fixed portion of the weight transaction record preferably contains a vehicle identifier, inbound weight, inbound date and time, inbound mode, and digital weight indicator identifier for the inbound weighing. For outbound weighing, the weight transaction record preferably contains the outbound weight, outbound date and time, outbound mode, and digital weight indicator identifier for the outbound weighing. The inbound and outbound mode fields may have one of four values: 'V' for a verified scale weight, blank for an unverified scale weight, 'S' for a stored tare weight, and 'M' for a manually entered weight. The weight transaction record also contains the inspector identifier and the digital signature based on the inspector's private key. The free portion of the record may vary from one application to the next, but typically contains all information required to completely reconstruct a transaction (e.g., ticket number, customer identifier, unit price, total charge, etc.).

The request for an inbound weight is then transmitted to the WVD 84. Next, the inbound weight is read from the digital weight indicator and transmitted to the WVD 86. The WVD then generates a digital signature based on, preferably, the inbound weight, the inbound date and time, a mode of 'V', and the digital weight indicator identifier 88. The digital signature may also be based on a fewer number of fields and/or different fields in the record. Preferably, the digital signature generated by the WVD is based on a secure hash of the transaction data and the inspector's private key stored in the WVD. As used herein, a digital signature may refer to any type of digital information that may be stored in or associated with a record and that may be used for verification of the data contained in the record. Other types of encryption/decryption and encoding/decoding technology may be used. Any type of technology in which the origin or source of a record may be verified may be used with the present invention.

Digital signature technology today is an outgrowth of public key cryptography which was first proposed by Whitfield Diffie and Martin Hellman in 1976. The first practical implementation of digital signature technology was by Rivest, Shamir and Adleman (RSA) in 1978. Another widely used system for implementing digital signatures is the government's own NIST Digital Signature Standard. Either of theses implementations is appropriate for the Weight Verification Device. For example, components of the BSAFE tool kit from RSA may be integrated into the WVD.

The WVD then transmits to the scale operator's computer a string comprising the inbound weight, the inbound date and time, an inbound mode of 'V', the digital weight indicator identifier, and the digital signature 90. Preferably, the scale operator's computer stores the string from the WVD verbatim in its (partially complete) weight transaction record 92.

At the time of outbound weighing, the scale operator's computer initiates a request for a final weight 94. The original transaction record is retrieved by the scale operator's computer and the entire initial weight string as stored in the original transaction record is included in the request for the final weight which is sent to the WVD 96. The WVD verifies the digital signature stored in the transaction record by computing a digital signature based on the information in the transaction record and the inspector's private key stored in the WVD 98. If the signature from the inbound weighing does not pass verification (for instance, the vehicle id has been changed) 100, the WVD blanks out the inbound mode 102. The WVD then transmits to the scale operator's computer a final or outbound weight string, consisting of the outbound weight, the outbound date and time, the outbound mode, the digital weight indicator identifier, the inspector identifier, and the calculated net weight (i.e., outbound weight−inbound weight) 104. The scale operator's computer uses the WVD's calculated net weight to complete the rest of the weight transaction record (for instance, total charge) 106 and transmits the entire weight transaction record back to the WVD 108. The WVD then confirms that the fixed portion of the weight transaction record has not changed 110, calculates and inserts in the weight transaction record a digital signature based on the entire transaction data and the private key 112, and transmits it to the scale operator's computer 114. The completed weight transaction record is then stored at the scale operator's computer 116.

Once the weight transaction record is complete, it may be verified by any interested party in conjunction with verification software that operates in accordance with the applicable digital signature standard employed in the WVD. Anyone wishing to verify the data in a weight transaction record, uses the "public" key that corresponds to the inspector identifier given in the weight transaction record. A list of valid inspector identifiers and corresponding public keys is made available, preferably, from a source other than the transaction data itself. For example, a list may be available through a Department of Weights and Measures web site on the Internet. Computers operated by the Department of Weights and Measures may generate the private and public key pairs as used by the present invention and support the web site through which the public keys are made available. Alternatively, a list of public keys may be distributed to interested parties by the Department of Weights and Measures.

If, at any later time, the weight transaction data needs to be edited, the editing software on the scale operator's computer flags the original weight transaction record as void and creates a new weight transaction record (preferably with the same ticket number), but with a blank digital signature. For subsequent processing of the new weight transaction record by any interested party, the blank digital signature indicate to the verification software that the transaction data has been modified, but not fraudulently manipulated. The verification software therefore, can verify the transaction data, but will not reject the transaction as being fraudulent. At the same time, the original weight transaction record, although voided, may still be inspected and verified. A comparison of the original weight transaction record and new weight transaction record reveals exactly what changed during the edit.

Figure 4:
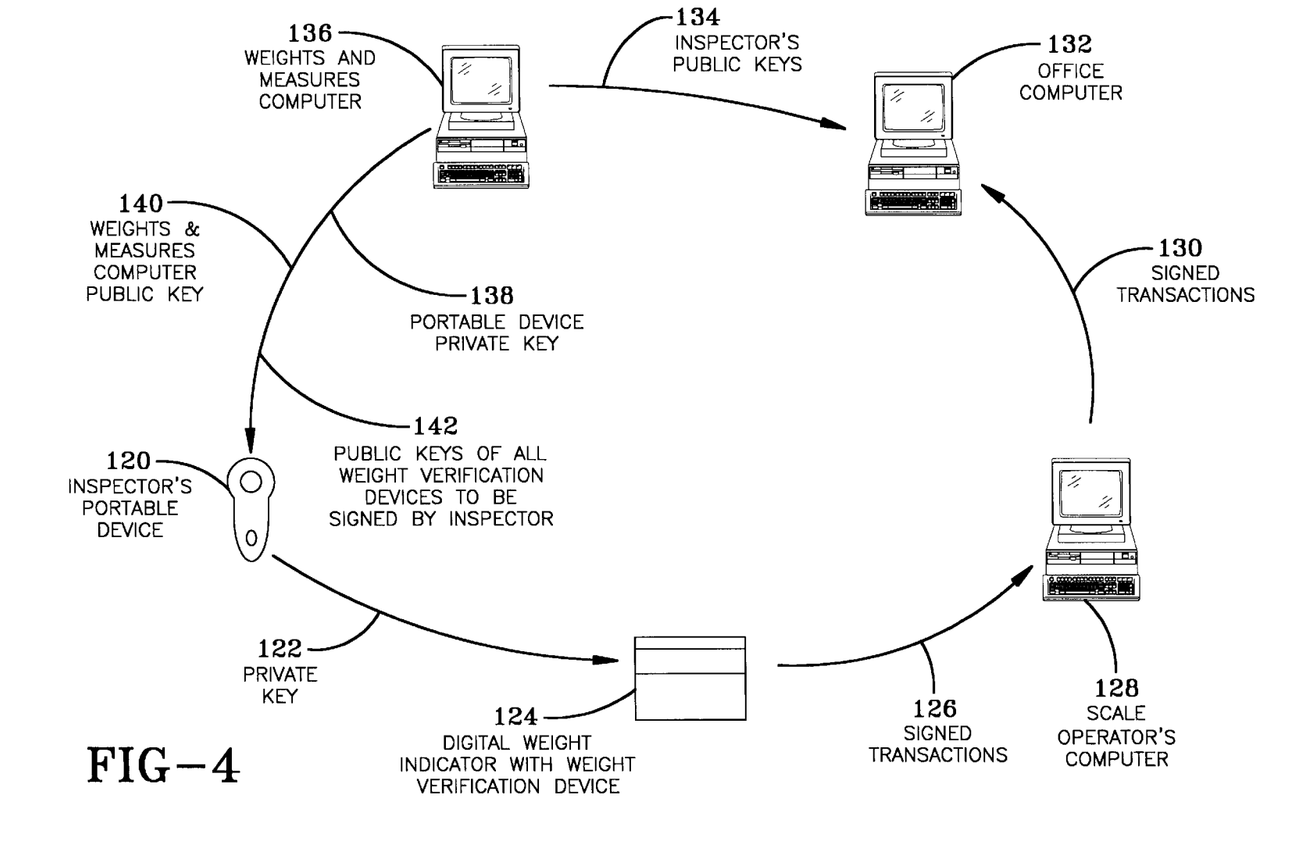
FIG. 4 is a block diagram of the primary components for a preferred embodiment of the present invention.

As indicated previously, one important aspect of the present invention is the use of digital signature technology to prevent fraudulent weight transactions. Protection of the private keys that are used in conjunction with the digital signature technology is also important. The inspector's private key may be protected from unauthorized release by storing it on a device that the inspector carries with him. Referring to FIG. 4, one candidate for such a portable or handheld device is the Dallas Semiconductor iButton. The iButton is a half-inch diameter portable device capable of storing programs and data and can be mounted on a ring or key chain. Preferably, when a new key pair ("private key" and "public key") is generated and assigned to an inspector (e.g., by a Department of Weights and Measures computer 136), the private key is transmitted directly to the portable device 138 while the corresponding or associated public key is made available at a web site. An inspector may use the portable device to certify any number of digital weight indicators equipped with a weight verification device.

To certify the digital weight indicator and associated weight verification device, the inspector opens the calibration access door and performs any necessary adjustments. Then, he inserts the portable device into the private key receptor (or direct contact interface) in the indicator. As soon as the access door is closed, the weight verification device extracts the inspector's private key from the portable device. On completion, lights that may be seen from the front panel of the weight verification device indicate that the private key has been successfully installed. The inspector removes the portable device and the indicator is ready to begin certifying weights as described above.

The use of the portable device or similar hand-held device that allows an inspector's private key to be transferred directly to an indicator via the private key receptor (or any other type of direct contact interface) reduces the likelihood that an unauthorized party will gain access to the inspector's private key by, for example, eavesdropping during the transfer. In addition, the use of the portable device or similar device obviates the need for storing the private key on a computer or other device to which an unauthorized party may obtain access as the private key is transferred directly to the portable device at the time of its generation and assignment. However, additional measures may be taken to further prevent the unauthorized release of an inspector's private key by ensuring that the portable device transfers the private key only to weight verification devices it recognizes.

Referring to FIG. 4, a block diagram of the primary components of an embodiment of the present invention in which the inspector's private key is protected from unauthorized release is shown. The components of FIG. 4 communicate with each other using a variety of well-known types of communication links and techniques (e.g., modem communication links, wireless communication links, dedicated communication links, etc.). The Department of Weights and Measures computer 136 creates and assigns to each inspector a private and public key pair. At the time of key generation and assignment, the private key is transferred 138 to the inspector's portable device 120 and the public key is stored in a database which may be made available at a web site. The Weights and Measures computer 136 is also assigned its own private and public key pair. The Weights and Measures computer 136 then transfers to the inspector's portable device 120 its public key 140. Now, the portable device 120 has its own private key and it has the public key of the Weights and Measures computer.

Before certifying an indicator, the inspector obtains clearance from the Department of Weights and Measures to access the Weights and Measures computer 136. The inspector accesses the Department of Weights and Measures web site and requests the public keys of all the weight verification devices that he will seal according the procedures described previously. The Weights and Measures computer 136 transfers to the inspector's portable device 120, preferably, as a digitally signed message with the Department of Weights and Measures computer private key, a list of public keys for the appropriate weight verification devices 142. The inspector's portable device 120 then uses the Weights and Measure's computer's public key (which was stored in the portable device at the time that it received its own private key) to verify the list and its source. At the time of sealing a digital weight indicator 124, the portable device sends its private key 122 to the weight verification device 124 preferably, in a message encrypted with the weight verification device's public key. The weight verification device 124 uses its private key to decrypt the encrypted message, determine the portable device's private key, and store it. As a result of this procedure, the private key transfer 122 from the portable device 120 to the weight verification device 124 is immune to a "man in the middle" attack. Even if an eavesdropping device is interposed between the portable device 120 and the digital weight indicator 124 with the weight verification device, it will not be able to decrypt the message it receives and pilfer the portable device's private key.

Once the Digital Weight Indicator 124 has a private key, it is ready to start signing weight transactions with the private key as described above. Signed transactions are then transferred 126 to the Scale Operator's computer 128 so they may be distributed to other computers for later verification. As shown in FIG. 4, signed transactions may be sent 130 from the Scale Operator's computer 128 to a computer at another location (e.g., Office computer) 132 that has the appropriate verification software. To verify a transaction, the Office computer 132 accesses the Weights & Measures computer 136 to obtain the public keys for one or more inspector(s) 134. Using an inspector's public key, the Office computer verifies the transaction data sent from a digital weight indicator sealed with the same inspector's private key.

The portable device private key may be transmitted to the weight verification device using various encryption and decryption technologies. As long as the weight verification device is adapted to decrypt the encrypted message containing the portable device private key, the portable device private key may be protected from eavesdroppers. Digital signature technology may be used for stamping and verification of weight transaction data even if other encryption/decryption techniques are used to protect the portable device private key during its transfer from the portable device to the weight verification device.

The present invention results in a number of benefits over the prior art. The present invention incorporates digital signature technology into a digital weight indicator so that a computer program (i.e., verification software) may verify that a weight transaction record contains a valid digital signature. However, the program is not capable of generating or forging a valid digital signature. In the same way, any application software that has access to the raw transaction data, as generated by the system of the present invention, may verify that the weights are accurate as certified by the Department of Weights and Measures (or a representative). Access to the digital weight indicator at which the weighing occurred is not required to verify the transaction record. In a preferred embodiment of the present invention, an operator or other individual who wants to verify the data in a weight transaction record needs only the publicly available information associated with the digital signature (e.g., the public key associated with the private key) and the transaction data to verify the record. Additionally, application software, whether local or located remotely from the digital weight indicator, may verify that a complete weight transaction record is identical to the weight transaction record that existed at the time of the final, outbound weighing and that the data have not been altered. The ability to determine whether the data have been altered exists no matter how many times the weight transaction record changes hands or where it is sent, nor how old it is. Verification is at the transaction record level so that specific weight transaction records may be extracted from the database and verified independently by any interested party with verification software that complies with the applicable digital signature or encryption/decryption standard. Manipulation or reformatting of the data, of course, destroys the verification so that it is clear to an operator or other interested party that data has been manipulated or reformatted. The present invention thus assists in the detection of fraud in weight transactions and may ultimately assist in the prevention of fraud as well. Once the fraud has been discovered, it may be possible to discover the source of the fraud and prevent it from occurring again.

In addition to ensuring the integrity of weight transaction data, the WVD is designed in such a way that it is difficult to breach the security of the device itself. In a preferred embodiment, the WVD is a "black box" device such that it performs a set of operations on the data in the weight transaction record, but it cannot be read. Preferably, it is designed and implemented such that no command exists, for example, for extracting the private key once it has been installed by an inspector. Additional security measures for protecting the private key include the use of an encrypted message to transmit the private key to the weight verification device. The weight verification device decrypts the message, stores the private key in a memory unit, and uses the private key to create a digital signature for the weight transaction data. Additionally, physically breaching the WVD renders it inoperative. The application or verification software on the scale operator's computer, on the other hand, adheres to a public protocol such that no key or secret component resides in the scale operator's computer. Furthermore, any interested party may use verification software that complies with the applicable digital signature standard (including the private and public protocols) to verify the weight transaction data. As the WVD deletes the private key when it is physically breached, the physical security of the WVD is equal to that which prevents someone from changing the calibration on an digital weight indicator, but need not be superior because calibration then constitutes the "weak link" in the validation chain. The integrity of the WVD may be monitored from a remote location by checking for the presence of the private key. If the private key has been erased, then an operator, who may be at a remote location, knows that the physical security of the WVD has been breached.

The present invention has been disclosed with reference to the disclosed embodiments. Many types of verification technology, including public/private key encryption and digital signature technology, may be used with the present invention. It will be apparent to one skilled in the art that variations and modifications may be made without departing from the invention in its broader aspects.

What is claimed is:

1. A method for protecting a portable device private key used to stamp weight transaction data with a digital signature comprising the steps of:
   (a) assigning a first private key to a computer and a second private key to a weight verification device;
   (b) assigning a first public key to said computer, a second public key to said weight verification device and a third public key to said portable device;

(c) transmitting to said portable device said first public key assigned to said computer;

(d) storing in said portable device said first public key assigned to said computer;

(e) transmitting to said portable device said second public key assigned to said weight verification device;

(f) verifying said second public key transmitted from said computer to said portable device;

(g) transmitting from said portable device to said weight verification device said portable device private key; and (h) verifying said portable device private key transmitted from said portable device to said weight verification device.

2. The method of claim 1 wherein the step of (d) transmitting to said portable device said public key comprises the step of transmitting said public key in a message digitally signed with said private key assigned to said computer.

3. The method of claim 2 wherein the step of (e) verifying said public key comprises the step of using said public key assigned to said computer to verify said public key assigned to said weight verification device.

4. The method of claim 1 wherein the step of (f) transmitting said portable device private key comprises the step of transmitting said portable device private key as a message encrypted with said public key assigned to said weight verification device.

5. The method of claim 4 further comprising the step of storing said portable device private key in said weight verification device if said encrypted message is decrypted in accordance with said private key assigned to said weight verification device.

6. The method of claim 5 further comprising the step of digitally signing weight transaction data with said portable device private key stored in said weight verification device.

7. The method of claim 1 wherein said portable device is a hand-held device adapted to store programs and data.

8. A system for protecting a private key used to digitally sign weight transaction data comprising:

a weight verification device adapted to store a private key, a public key, and a portable device private key;

a computer adapted to store a private key, a public key, and said weight verification public key;

a portable device adapted to store said portable device private key, a public key, and said computer public key;

a first communication link between said portable device and said computer for transmitting from said computer to said portable device a first message with said weight verification device public key, said first message digitally signed with said computer private key;

a first verification program in said portable device to verify said first message in accordance with said computer public key stored in said portable device;

a second communication link between said portable device and said weight verification device for transmitting from said portable device to said weight verification device a second message with said portable device private key, said second message encrypted with said weight verification device public key; and a second verification program in said weight verification device to verify said second message in accordance with said weight verification device private key.

9. The system of claim 8 wherein said portable device is a hand-held device adapted to store programs and data.

10. The system of claim 9 wherein said second message is transmitted from said portable device to said weight verification device via a direct contact interface.

11. The system of claim 8 wherein said portable device private key is stored in said weight verification device if said second message is verified in accordance with said weight verification device private key.

12. A method for protecting a portable device private key assigned to a portable device, said portable device private key used in verification of weight transaction data comprising the steps of:

assigning a computer public key and a computer private key to a computer;

assigning a weight verification device public key and a weight verification device private key to a weight verification device;

transmitting said computer public key to said portable device;

transmitting a first message from said computer to said portable device, said first message comprising said weight verification device public key encrypted in accordance with said computer private key;

decrypting at said portable device said first message in accordance with said computer public key;

transmitting a second message from said computer to said portable device, said second message comprising said portable device private key encrypted in accordance with said computer private key;

decrypting said first message at said portable device in accordance with said computer public key;

transmitting a third message from said portable device to said weight verification device, said third message comprising said portable device private key encrypted in accordance with said weight verification device public key; and decrypting said third message at said weight verification device in accordance with said weight verification device private key.

13. The method of claim 12 further comprising the step of storing in said weight verification device said portable device key private key from said third message.

14. The method of claim 12 further comprising the step of digitally signing weight transaction data with said portable device private key stored in said weight verification device.

15. The method of claim 12 wherein said portable device is a hand-held device adapted to store programs and data.

* * * * *